United States Patent
Nishiumi (10) Patent No.: US 9,222,621 B2
(45) Date of Patent: Dec. 29, 2015

(54) GAS FILLING SYSTEM

(71) Applicant: Hiroaki Nishiumi, Toyota (JP)

(72) Inventor: Hiroaki Nishiumi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/974,184

(22) Filed: Aug. 23, 2013

(65) Prior Publication Data

US 2013/0340888 A1    Dec. 26, 2013

Related U.S. Application Data (63) Continuation of application No. 13/203,912, filed as application No. PCT/JP2009/063491 on Jul. 29, 2009, now abandoned.

(51) Int. Cl.
*B65B 1/30* (2006.01)
*F17C 13/02* (2006.01)
*F17C 5/06* (2006.01)

(52) U.S. Cl.
CPC .............. *F17C 13/026* (2013.01); *F17C 5/06* (2013.01); *F17C 13/02* (2013.01); *Y02E 60/50* (2013.01)

(58) Field of Classification Search
CPC ........... F17C 13/026; F17C 5/06; F17C 13/02
USPC ............................ 141/39, 47, 82, 94, 95, 197
See application file for complete search history.

(56) References Cited

U.S. PATENT DOCUMENTS

| | | | |
|---|---|---|---|
| 7,896,036 B2 * | 3/2011 | Kobayashi et al. | 141/94 |
| 2009/0107577 A1 * | 4/2009 | Allidieres et al. | 141/1 |

FOREIGN PATENT DOCUMENTS

| | | |
|---|---|---|
| JP | 2001-355795 A | 12/2001 |
| JP | 2004-028211 A | 1/2004 |
| JP | 2004-084808 A | 3/2004 |
| JP | 2004-116619 A | 4/2004 |
| JP | 2005-083567 A | 3/2005 |
| JP | 2006-214512 A | 8/2006 |
| JP | 2006-226511 A | 8/2006 |
| JP | 2006-316817 A | 11/2006 |
| JP | 2008-202619 A | 9/2008 |
| JP | 2008-281108 A | 11/2008 |
| JP | 2011-033068 A | 2/2011 |
| JP | 2011-033069 A | 2/2011 |

OTHER PUBLICATIONS

U.S. Appl. No. 13/203,912, Advisory Action mailed Sep. 5, 2013.

* cited by examiner

*Primary Examiner* — Jason K Niesz
(74) *Attorney, Agent, or Firm* — Kenyon & Kenyon LLP (57) ABSTRACT

To provide a gas filling system capable of optimizing filling of a gas tank depending on the cooling capability of a gas station. A gas filling system comprises: a vehicle having a gas tank; a gas station having a cooling device that cools a gas from a gas supply source, the gas station discharging the gas cooled by the cooling device to fill the gas tank with the gas, and a temperature sensor that detects the temperature of the gas cooled by the cooling device on the upstream side of the gas tank. The vehicle has a first controller that determines the filling flow rate of the gas to the gas tank based on the gas temperature detected by the temperature sensor.

12 Claims, 4 Drawing Sheets

GAS FILLING SYSTEM

CROSS REFERENCE

This application is a continuation of U.S. application Ser. No. 13/203,912, entitled "GAS FILLING SYSTEM", filed on Aug. 30, 2011, which is a 371 national phase application of PCT/JP2009/063491 filed Jul. 29, 2009, the contents of which are incorporated herein by reference.

TECHNICAL FIELD

The present invention relates to a gas filling system that fills a gas tank mounted on a vehicle with a gas at a gas station.

BACKGROUND ART

A gas fuel vehicle having a gas tank, such as a fuel cell vehicle, stops at a gas station to fill the gas tank with a fuel gas dispensed through a filling nozzle. As known, if the fuel gas is hydrogen gas, the temperature rises as the tank is filled.

The hydrogen station described in Patent Document 1 comprises a storage unit that stores pressurized hydrogen gas, a dispenser that fills the gas tank with the hydrogen gas from the storage unit, and an absorption chiller that cools the hydrogen gas. The absorption chiller previously cools the hydrogen gas supplied to the storage unit and the dispenser, and the gas tank is filled with the previously cooled hydrogen gas. Thus, the filling time is reduced.

CITATION LIST

Patent Document

Patent Document 1: Japanese Patent Laid-Open No. 2005-83567

SUMMARY OF INVENTION

Technical Problem

However, when a plurality of fuel cell vehicles are successively filled, the chiller may be unable to adequately cool the hydrogen gas depending on the cooling capability. If the gas tank is filled with the inadequately cooled hydrogen gas at the same flow rate as that of the adequately cooled hydrogen gas, the temperature in the gas tank may rise beyond the design temperature (85 degrees C., for example). In this regard, the technique disclosed in Patent Document 1 does not take the cooling capability of the chiller into account and thus needs further improvement.

In addition, the technique disclosed in Patent Document 1 does not consider the way of determining the filling flow rate. Supposing that the hydrogen station determines the filling flow rate regardless of the conditions of the vehicle, the determined flow rate is not always optimum for the vehicle.

An object of the present invention is to provide a gas filling system that can optimally fill a gas tank depending on the cooling capability of a gas station.

Means for Solving the Problems

In order to attain the object, a gas filling system according to the present invention comprises: a vehicle having a gas tank; a gas station having a cooling device that cools a gas from a gas supply source, the gas station discharging the gas cooled by the cooling device to fill said gas tank with the gas, a temperature sensor that detects the temperature of the gas cooled by said cooling device on the upstream side of said gas tank; and a first controller that determines the filling flow rate of the gas to said gas tank based on the gas temperature detected by said temperature sensor. The first controller is provided in said vehicle.

According to the present invention, the filling flow rate can be changed depending on the temperature of the gas cooled by the cooling device, and therefore, filling can be optimally performed depending on the cooling capability of the cooling device. As a result, the gas tank can be filled with a predetermined amount of gas (a full or specified amount of gas) in the shortest possible time while maintaining a stable internal condition of the gas tank. In addition, since the first controller in the vehicle determines the filling flow rate, it is also possible that an optimum filling flow rate reflecting conditions of the vehicle (characteristics of the gas tank, for example) is determined.

Preferably, said first controller may have a map of the filling flow rate for each gas temperature to be detected by said temperature sensor and may select the filling flow rate from the map based on the gas temperature detected by said temperature sensor. With this configuration, the filling flow rate can be easily determined. In particular, the first controller of the vehicle can retain a map produced by taking into account the conditions of the vehicle (characteristics of the gas tank, for example), so that the map does not need to be updated for each vehicle on the gas station side.

Preferably, said first controller may determine the filling flow rate based on characteristics concerning said gas tank. With this configuration, an optimum filling flow rate reflecting the characteristics concerning the gas tank can be determined. Here, the characteristics concerning the gas tank include characteristics of the gas tank and characteristics of influences exerted on the gas tank. The former characteristics primarily include the heat radiation performance and the temperature rise rate. The latter characteristics include the cooling characteristics that vary depending on the position of the gas tank in the vehicle, for example.

Preferably, said temperature sensor may detect said gas temperature at the start of filling or during filling. According to the configuration, in the case where the gas temperature is detected at the start of filling, the cooling capability of the cooling device can be determined at the start of filling. Meanwhile, in the case where the gas temperature is detected during filling, the presence or absence of an abnormality of the cooling device can be detected during filling. In addition, in the case where the gas temperature is detected during filling, the filling flow rate can be determined again during filling depending on the detected gas temperature.

According to a preferred aspect of the present invention, said vehicle may have a first communication device connected to said first controller. The gas station may have a flow rate controlling device; a second communication device that receives information about said determined filling flow rate from said first communication device; and a second controller that controls said flow rate controlling device to achieve the filling flow rate received by said second communication device. According to this configuration, the vehicle and the gas station can communicate with each other, so that the filling flow rate determined in the vehicle does not need to be manually input to the gas station.

More preferably, said temperature sensor may detect the gas temperature at said cooling device. With this configuration, filling can be optimized based on the gas temperature at the cooling device, and the cooling capability of the cooling device and the presence or absence of an abnormality of the cooling device can be suitably determined.

Preferably, at least one of said first controller and said second controller may store a transmission/reception history between said first communication device and said second communication device. More preferably, said transmission/reception history may include a history of transmission of the information about said determined filling flow rate from said first communication device to said second communication device. According to such configuration, for example, when the vehicle is inspected, whether or not filling has been performed at the optimum filling flow rate reflecting the conditions of the vehicle can be checked by checking the transmission/reception history.

Preferably, the gas filling system according to the present invention may further comprise a display device that provides an indication that said filling flow rate is being controlled or has been controlled based on the gas temperature detected by said temperature sensor. According to this configuration, a person who performs filling can visually check whether filling is being or has been optimally performed according to the cooling capability.

Preferably, said first controller may determine a lower filling flow rate when said temperature sensor detects a higher gas temperature than when said temperature sensor detects a lower gas temperature. With this configuration, for example, even when the gas temperature is high as a result of successive fillings, the gas tank can be filled with a predetermined amount of gas in a short time while preventing the temperature in the gas tank from reaching a design temperature. On the other hand, if the filling flow rate is raised when the gas temperature is low, the gas tank can be filled with a predetermined amount of gas in a shorter time than in the case where the gas temperature is high.

Preferably, the gas filling system according to the present invention may further comprise a sensor that obtains information about the interior of said gas tank, and said first controller may determine the filling flow rate based on the information obtained by said sensor. According to this configuration, filling can be performed suitably for the conditions in the gas tank to be filled. Furthermore, since the information about the interior of the gas tank is obtained by detection, the filling flow rate can be more precisely controlled than in the case where the information is obtained by estimation.

More preferably, said sensor may include at least one of a temperature sensor and a pressure sensor. According to this configuration, for example, when it is detected that the temperature in the gas tank is too high, the filling flow rate can be lowered to prevent further rise of the temperature in the gas tank.

EMBODIMENTS FOR CARRYING OUT THE INVENTION

In the following, a gas filling system according to a preferred embodiment of the present invention will be described with reference to the accompanying drawings. In the example described below, the gas filling system fills a fuel cell vehicle having a fuel cell system with hydrogen gas from a gas station. As well known, the fuel cell system has a fuel cell that generates electric power by an electrochemical reaction between a fuel gas (hydrogen gas, for example) and an oxidation gas (air, for example), or the like.

Figure 1:
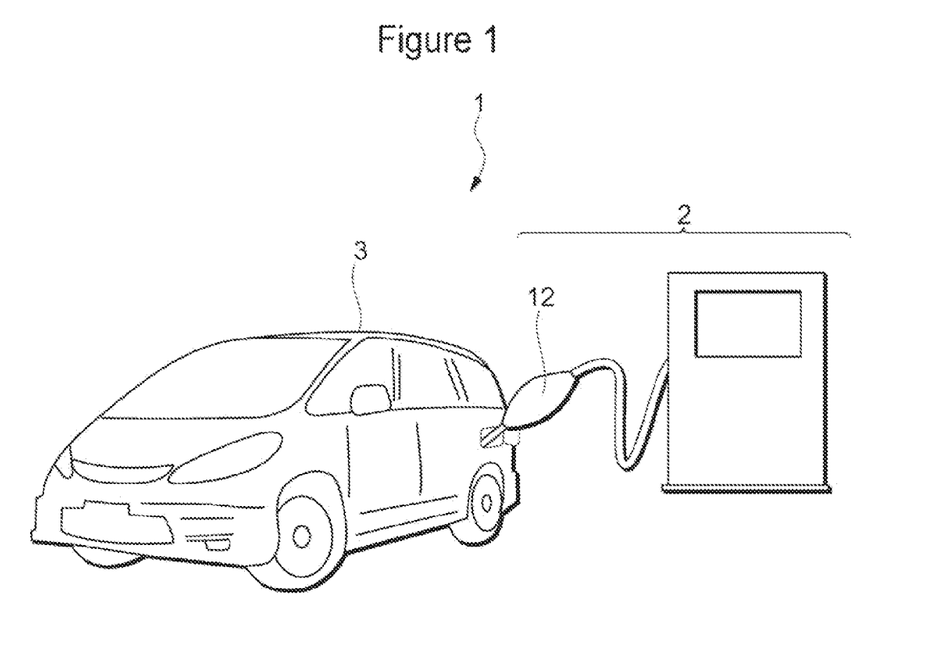
FIG. 1 is a schematic diagram showing a gas filling system according to an embodiment.

As shown in FIG. 1, a gas filling system 1 comprises a hydrogen station 2 serving as a gas station, and a fuel cell vehicle 3 to which hydrogen gas is supplied from the hydrogen station 2, for example.

Figure 2:
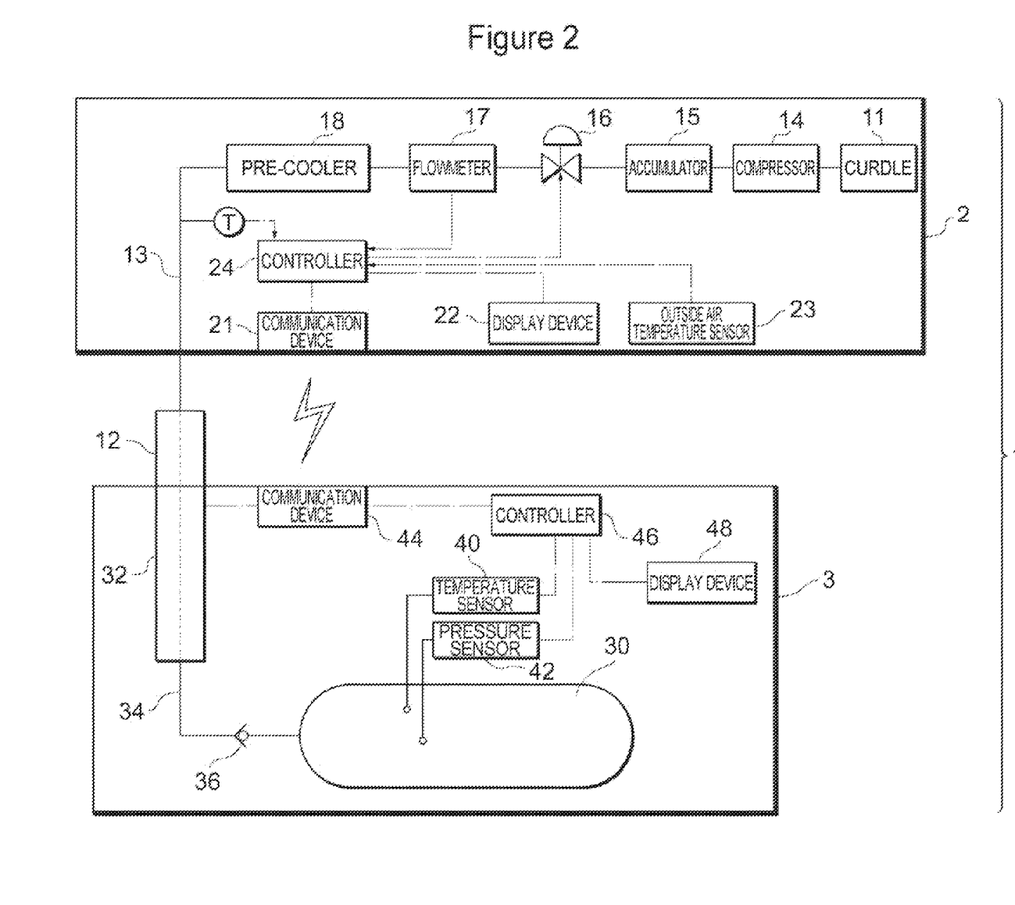
FIG. 2 is a diagram showing a configuration of the gas filling system according to the embodiment.

As shown in FIG. 2, the hydrogen station 2 has a curdle (gas supply source) 11 that stores hydrogen gas, a filling nozzle 12 for ejecting the hydrogen gas into a gas tank 30 mounted on the vehicle, and a gas flow channel 13 that connects the curdle 11 and the filling nozzle 12 to each other. The filling nozzle 12 is a component referred to also as a filling coupling and is connected to a receptacle 32 of the vehicle 3 when hydrogen gas filling is performed. The filling nozzle 12 and the receptacle 32 form a connection unit that connects the hydrogen station 2 and the gas tank 32 to each other.

The gas flow channel 13 includes, from the side of the curdle 11, a compressor 14 that compresses the hydrogen gas received from the curdle 11 and discharges the compressed hydrogen gas, an accumulator 15 that stores the hydrogen gas pressurized to a predetermined pressure by the compressor 14, a flow rate control valve 16 that adjusts the flow rate of the hydrogen gas supplied from the accumulator 15, a flowmeter 17 that measures the flow rate of the hydrogen gas, a pre-cooler 18 that preliminarily cools the hydrogen gas flowing in the gas flow channel 13, and a temperature sensor T that detects the temperature of the hydrogen gas on the downstream side of the pre-cooler 18. The hydrogen station 2 further has a communication device 21, a display device 22, an outside air temperature sensor 23 and a controller 24, and various devices are electrically connected to the controller 24. Although not shown, a shut-off valve that opens the gas flow channel 13 when filling is performed is disposed on the accumulator 13 or on the downstream side of the accumulator 13.

The flow rate control valve 16 is an electrically driven valve, and the driving source is a step motor, for example. The flow rate of the hydrogen gas is adjusted by changing the valve position of the flow rate control valve 16 by means of the step motor in response to the instruction from the controller 24. In this way, the filling flow rate of the hydrogen gas to the gas tank 30 is controlled. The flowmeter 17 measures the controlled filling flow rate, and the controller 24 feedback-controls the flow rate control valve 16 to achieve a desired filling flow rate based on the measurement. As an alternative, a flow rate controlling device other than the flow fate control valve 16 may be used.

The pre-cooler 18 cools the hydrogen gas from the accumulator 15 from about room temperature to a predetermined low temperature (−20 degrees C., for example) by heat exchange. The heat exchange in the pre-cooler 18 may be any of indirect heat exchange, intermediate medium heat exchange and regenerative heat exchange, and the pre-cooler 18 can have a well-known structure. For example, the pre-cooler 18 has a pipe through which hydrogen gas flows, and the pipe is housed in a container in which a coolant flows to achieve heat exchange between the hydrogen gas and the coolant. In this case, the temperature of the cooled hydrogen gas can be adjusted by adjusting the amount and temperature of the coolant supplied to the container. The temperature sensor T detects the temperature of the hydrogen gas cooled by the pre-cooler 18 in this way, and the detection signal is input to the controller 24.

The communication device 21 has a communication interface to perform radio communication, such as infrared communication. The display device 22 displays various kinds of information, such as the filling flow rate during filling, on a screen thereof. The display device 22 may have an operation panel for selecting or specifying a desired filling amount or the like on the display screen.

The controller 24 is constituted by a microcomputer incorporating a CPU, a ROM and a RAM. The CPU performs desired calculations according to a control program to perform various controlling and other processing. The ROM stores the control program and control data processed by the CPU, and the RAM is used mainly as working spaces for various controlling processing. The controller 24 is electrically connected not only to the communication device 21 and other devices shown by the alternate long and short dash lines in FIG. 2 but also to the curdle 11, the compressor 14, the accumulator 15 and the pre-cooler 18 to comprehensively control the entire hydrogen station 2. The controller 24 controls the communication device 21 to transmit information available in the hydrogen station 2 to the vehicle 3.

The vehicle 3 has the gas tank 30 and the receptacle 32 described above. The gas tank 30 is a fuel gas supply source for a fuel cell and is a high-pressure tank capable of storing hydrogen gas at 35 MPa or 70 MPa, for example. The hydrogen gas in the gas tank 30 is supplied to the fuel cell through a supply pipe (not shown). The gas tank 30 is replenished with hydrogen gas from the hydrogen station 2 through the receptacle 32 and a filling pipe 34. The filling pipe 34 includes a check valve 36 to prevent backflow of the hydrogen gas, for example. A temperature sensor 40 and a pressure sensor 42 detect the temperature and pressure of the hydrogen gas in the gas tank 30, respectively, and can be provided on the supply pipe or filling pipe 34.

The vehicle 3 further has a communication device 44 that transmits and receives various kinds of information to and from the communication device 21 of the hydrogen station 2, a controller 46 constituted by a microcomputer as with the controller 24 of the hydrogen station 2, and a display device 48 that displays various kinds of information on a screen. The communication device 44 is associated with the communication device 21 and has a communication interface to perform radio communication, such as infrared communication. The communication device 44 is incorporated in the receptacle 32 or fixed in a lid box of the vehicle 3 so that the communication device 44 can communicate with the communication device 21 with the filling nozzle 12 connected to the receptacle 32. The controller 46 comprehensively controls the vehicle 3 based on the detection results received from various sensors including the temperature sensor 40 and the pressure sensor 42. In addition, the controller 46 controls the communication device 44 to transmit information available in the vehicle 3 to the hydrogen station 2. The display device 48 may be a part of a car navigation system, for example.

In the gas filling system 1 described above, when the vehicle 3 is filled with hydrogen gas, the filling nozzle 12 is first connected to the receptacle 32. Then, the hydrogen station 2 is activated. Then, the hydrogen gas stored in the accumulator 15 is cooled by the pre-cooler 18 and then discharged into the gas tank 30 through the filling nozzle 12 to fill the gas tank 30.

The gas filling system 1 according to this embodiment controls the filling flow rate by determining the filling flow rate in the vehicle 3 and transmitting the data thereof to the hydrogen station 2.

Figure 3:
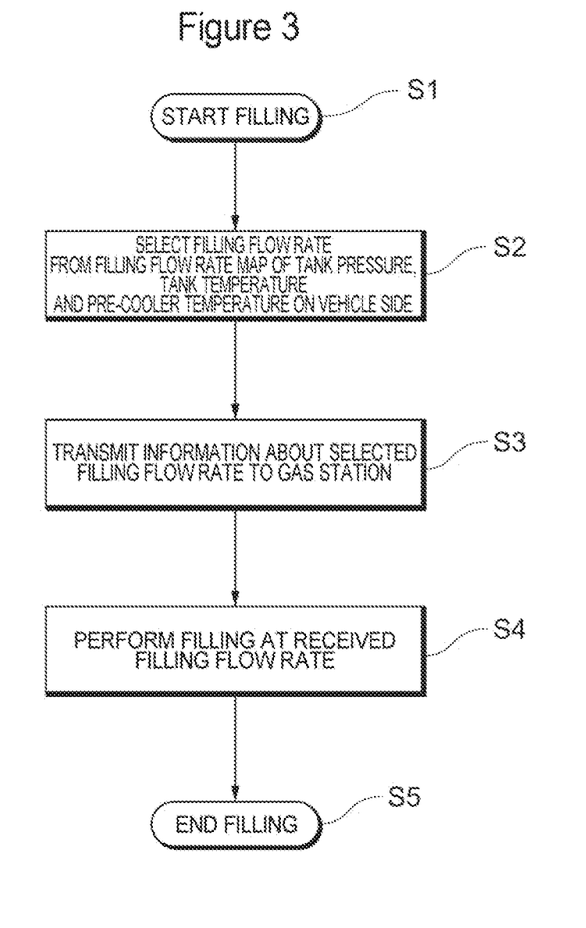
FIG. 3 is a flow chart for illustrating a filling process of the gas filling system according to the embodiment.

Next, with reference to the flowchart of FIG. 3, determination and control of the filling flow rate by the gas filling system 1 will be described.

First, when a person who performs filling connects the filling nozzle 12 to the receptacle 32 and performs a filling start operation to permit discharge of hydrogen gas from the hydrogen station 2 to the gas tank 30, filling is started (step S1). Then, the hydrogen gas stored in the accumulator 15 is cooled by the pre-cooler 18 and then discharged into the gas tank 30.

When filling is started, the tank pressure, the tank temperature and the pre-cooler temperature are read. The tank pressure is the pressure of the hydrogen gas in the gas tank 30 and is detected by the pressure sensor 42. The tank temperature is the temperature of the hydrogen gas in the gas tank 30 and is detected by the temperature sensor 40. The detection signals indicating the tank pressure and the tank temperature are input to the controller 46. Thus, the controller 46 grasps the tank pressure and the tank temperature immediately after the start of filling. On the other hand, the pre-cooler temperature is the temperature of the hydrogen gas in the pre-cooler 18 and is detected by the temperature sensor T. The detection signal indicating the pre-cooler temperature is input to the controller 24, and the controller 24 instructs the communication device 21 to transmit the detection value of the pre-cooler temperature to the communication device 44 in the vehicle 3. In this way, the controller 46 in the vehicle 3 grasps the pre-cooler temperature immediately after the start of filling.

Figure 4:
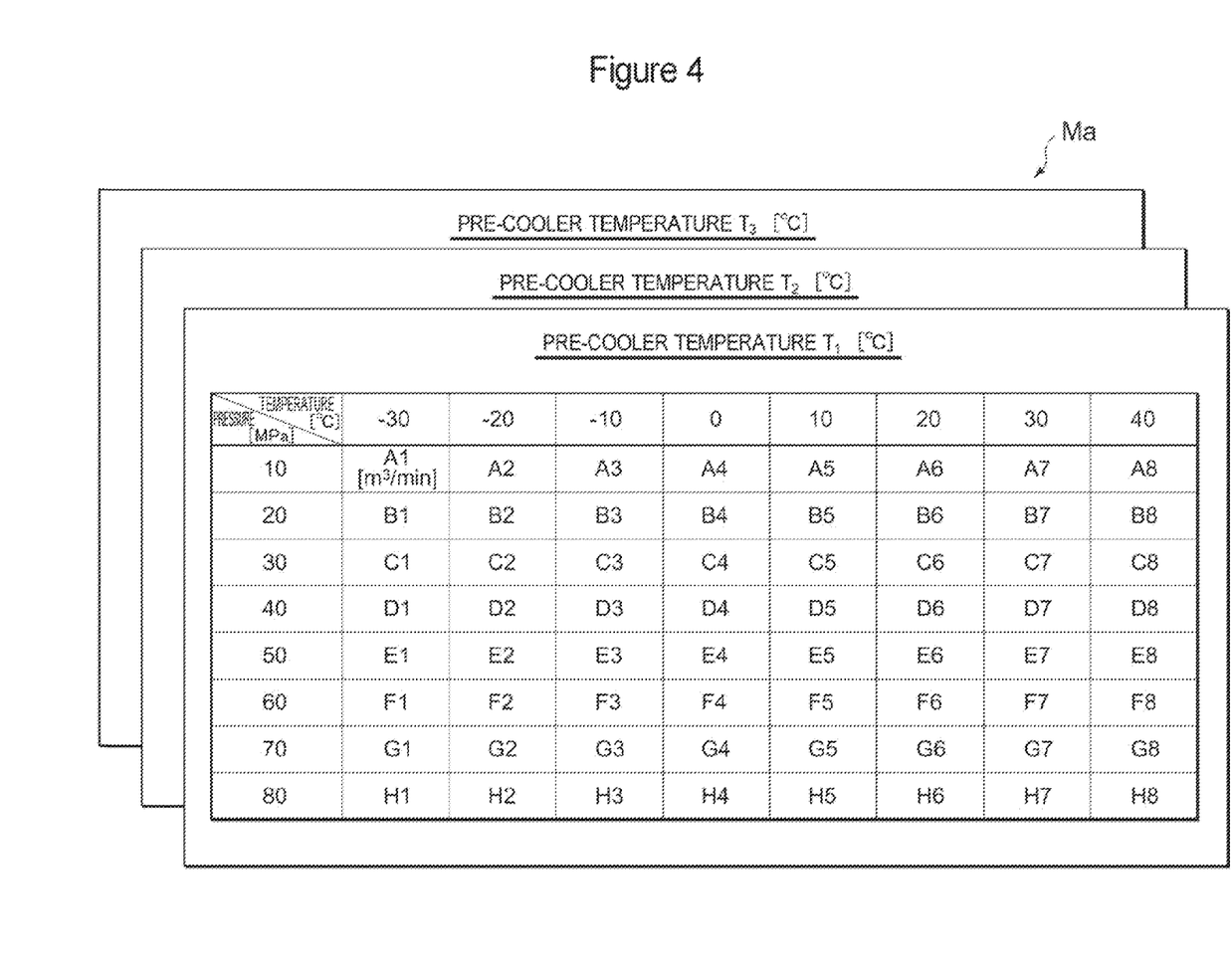
FIG. 4 is an example of a filling flow rate map used in the filling process according to the embodiment.

Once these three pieces of information are read, the controller 46 selects or determines the filling flow rate based on a filling flow rate map stored in the ROM or the like (step S2). FIG. 4 shows an example of the filling flow rate map. A filling flow rate map Ma is provided for each of a plurality of pre-cooler temperatures (for example, $T_1$, $T_2$ and $T_3$ relate to each other according to $T_1 < T_2 < T_3$), and the column and the row in the table represent the tank pressure and the tank temperature, respectively. For example, if the detected pre-cooler temperature is $T_1$, the detected tank pressure is 40 MPa, and the detected tank temperature is 0 degrees C., the controller 46 selects and determines D4 ($m^3$/min) as the filling flow rate.

Each filling flow rate in the filling flow rate map Ma is a filling flow rate at which the gas tank 30 can be smoothly and quickly filled with hydrogen gas under the condition determined by the tank pressure, the tank temperature and the pre-cooler temperature. More specifically, each filling flow rate in the filling flow rate map Ma is a flow rate at which the gas tank 30 can be filled with the highest possible amount (the full filling amount, for example) of hydrogen gas in the shortest possible time under the condition determined by the three factors described above while preventing the temperature in the gas tank 30 from reaching a predetermined upper limit (85 degrees C., for example) under the above three conditions. Although the tank pressure increases in increments of 10 MPa and the tank temperature increases in increments of 10 degrees C. in the filling flow rate map Ma, these increments can be arbitrarily set, of course. Similarly, the filling flow rate maps can be provided for any pre-cooler temperatures, such as every 2 to 3 degrees C., 5 degrees C. and 10 degrees C.

Here, two characteristics of the magnitude of the filling flow rate in the filling flow rate maps Ma will be described.

First, for the same tank pressure and the same tank temperature, the filling flow rate decreases as the pre-cooler temperature increases. For example, when the tank pressure is 40 MPa and the tank temperature is 0 degrees C., the filling flow rate for the pre-cooler temperature $T_2$ is lower than the filling flow rate D4 for the pre-cooler temperature $T_1$. By using the lower filling flow rate, the gas tank 30 can be filled in the shortest possible time while preventing the temperature in the gas tank 30 from reaching the upper limit even when the pre-cooler temperature rises because of successive fillings.

Second, for the same pre-cooler temperature, the filling flow rate can increase as the tank pressure increases. In addition, for the same pre-cooler temperature, the filling flow rate can increase as the tank temperature decreases. For example, for the pre-cooler temperature $T_1$, the filling flow rate H1 (for a tank pressure of 80 MPa and a tank temperature of −30 degrees C.) is the highest of the filling flow rates A1 to H8 in the filling flow rate map Ma, and the filling flow rate A8 (for a tank pressure of 10 MPa and a tank temperature of 40 degrees C.) is the lowest. By using lower filling flow rates for lower tank pressures or higher tank temperatures in this way, the gas tank 30 can be filled in the shortest possible time while preventing the temperature in the gas tank 30 from reaching the upper limit.

Such filling flow rate map Ma is preferably based on characteristics concerning the gas tank 30 mounted in the vehicle 3.

More specifically, various types of gas tanks 30 have been developed, and those gas tanks have different heat radiation performances or temperature rise rates depending on the material, the surface area, the structure thereof or the like. For example, a gas tank 30 lined with aluminum has a higher heat radiation performance than a gas tank 30 lined with resin (polyethylene or the like). In addition, the heat radiation performance of the gas tank 30 varies depending on the characteristics or composition of the resin used as the liner. Furthermore, the characteristics of cooling of the gas tank 30 by wind or the like varies depending on the position of the gas tank 30 in the vehicle 3. Thus, the characteristics of the gas tank 30 and the characteristics of influences exerted on the gas tank 30 can vary for the current or future vehicle 3.

Thus, according to a preferred aspect of this embodiment, the filling flow rate map Ma stored in the controller 46 of the vehicle 3 take into account the characteristics concerning the gas tank 30 mounted in the vehicle 3 described above. For example, if the gas tank 30 has an aluminum liner, the filling flow rate is higher than the gas tank 30 having a resin liner for the same tank pressure, tank temperature and pre-cooler temperature. Thus, the gas tank 30 having a higher heat radiation performance can be filled in a shorter time.

In step S3, the controller 46 of the vehicle 3 transmits the information about the filling flow rate determined in step S2 to the controller 24 of the hydrogen station 2 by communication between the communication device 44 and the communication device 21. In the following step S4, the controller 24 controls the hydrogen station 2 to achieve the communicated filling flow rate. More specifically, the controller 24 adjusts the valve position of the flow rate control valve 16 to achieve the communicated filling flow rate with reference to the measurement result of the flowmeter 17. As a result, the gas tank 30 is filled with hydrogen gas at a filling flow rate suitable for the current conditions of the tank pressure, the tank temperature and the pre-cooler temperature and the characteristics concerning the gas tank 30.

During the filling, at least one of the display device 22 of the hydrogen station 2 and the display device 48 of the vehicle 3 provides an indication that filling is being performed at the filling flow rate determined in step S2. In other words, the person who performs filling can confirm that the filling flow rate is selected and controlled based on various conditions including the pre-cooler temperature through the indication provided by at least one of the display devices 22 and 48 of the gas filling system 1.

Then, when the gas tank 30 is filled with a predetermined amount (an amount specified by the person who performs filling or a full filling amount) of hydrogen gas, supply of hydrogen gas from the hydrogen station 2 is stopped, and the filling is ended (step S5). Alternatively, at least one of the display devices 22 and 48 may provide the indication described above, such as an indication that the filling flow rate is controlled based on various conditions including the pre-cooler temperature, after the filling is ended or only after the filling is ended.

After the filling is ended, the storage section (the RAM described above, for example) of at least one of the controllers 24 and 46 in the gas filling system 1 preferably temporarily stores the transmission/reception history for the communication devices 44 and 21. For example, the transmission/reception history preferably includes a history of transmission of the pre-cooler temperature from the communication device 21 to the communication device 44 after the start of filling in step S1 or a history of transmission of information on the determined filling flow rate from the communication device 44 to the communication device 21 in step S3. Both the hydrogen station 2 and the vehicle 3 can retain the transmission/reception history. However, the transmission/reception history is particularly preferably retained in the vehicle 3. This is because it can be easily confirmed in automobile safety inspection whether or not filling has been performed according to the process shown in FIG. 3. In other words, if the transmission/reception history is retained only by the hydrogen station 2, the transmission/reception history concerning filling of a particular vehicle 3 has to be retrieved from various hydrogen stations 2 at different sites, and this is a troublesome task.

Advantages of the gas filling system 1 according to this embodiment described above will be described.

First, since the filling flow rate is determined based on the detected pre-cooler temperature, an optimum filling flow rate suitable for the cooling capability of the pre-cooler 18 can be determined. For example, as described above, when the pre-cooler temperature is relatively high, the filling flow rate can be relatively low. Thus, smooth and quick filling can be achieved while preventing the temperature in the gas tank 30 from exceeding the upper limit temperature. In other words, even if the pre-cooler 18 fails to adequately cool hydrogen gas, filling does not need to be suspended or stopped, so that the person who performs filling or the driver of the vehicle does not need to wait. On the other hand, when the pre-cooler temperature is relatively low, the filling flow rate can be relatively high. Thus, smooth and quick filling can be achieved in a shorter time while preventing the temperature in the gas tank 30 from exceeding the upper limit temperature.

Furthermore, the filling flow rate is determined based on actual information about the internal environment of the gas tank 30, that is, the actually measured tank pressure and tank temperature, a more suitable filling flow rate can be determined than in the case where these values are estimated. In other embodiments, the filling flow rate may be determined and controlled without taking into account either or both of the tank pressure and the tank temperature.

Furthermore, since the filling flow rate is determined based on the characteristics concerning the gas tank 30 (the heat radiation performance, for example), the optimum filling flow rate suitable for the gas tank 30 of the vehicle 3 can be determined. For example, if the gas tank 30 of the vehicle 3 has a relatively high heat radiation performance, a relatively high filling flow rate can be determined. Thus, smooth filling can be performed in a shorter time while preventing the temperature in the gas tank 30 from exceeding the upper limit temperature.

As described above, according to the preferred aspect of this embodiment, the optimum filling flow rate can be determined based on the temperature of the gas supplied from the gas station 2 to the gas tank 30 (the pre-cooler temperature) and the characteristics and the internal conditions (the tank pressure and the tank temperature) of the gas tank 30 to be filled. Therefore, the gas tank 30 can be filled with a predetermined amount of gas in the shortest possible time by the optimum filling method.

In addition, the filling flow rate is primarily determined by the vehicle 3 rather than the hydrogen station 2. In the case where the hydrogen station 2 primarily determines the filling flow rate unlike in this embodiment, the hydrogen station 2 can keep track of the characteristics concerning the gas tank 30 only to a limited extent. For example, even when a vehicle has its gas tank having a high temperature rise rate replaced with a new gas tank having a low temperature rise rate, the hydrogen station 2 determines the filling flow rate based on the filling flow rate map designed for the old gas tank having a high temperature rise rate. As a result, the filling time cannot be reduced.

To the contrary, according to this embodiment, since the vehicle 3 determines the filling flow rate, the filling flow rate can be determined from the filling flow rate map Ma designed for the gas tank 30 of the vehicle 3 without being affected by other vehicles. Thus, the optimum filling flow rate reflecting the characteristics concerning the gas tank 30 can be determined. Therefore, filling can be performed in the optimum manner for the gas tank 30 and therefore the vehicle 3 without losing the benefit of the technical advances of the gas tank 30 or the like. As for the hydrogen station 2, there is an advantage that the software of the filling flow rate map in the hydrogen station 2 does not need to be replaced for each new vehicle.

The vehicle 3 transmits data about the determined filling flow rate to the hydrogen station 2. Therefore, the filling flow rate determined by the vehicle 3 does not need to be manually input to the hydrogen station 2. Furthermore, since the transmission/reception history is stored, it can be checked in vehicle safety inspection or the like whether or not filling has been performed at the optimum filling flow rate described above.

Furthermore, according to this embodiment, since the pre-cooler temperature is detected at the start of filling, the cooling capability of the pre-cooler 18 can be determined at the start of filling. However, according to other embodiments, the pre-cooler temperature may be detected during filling. In this case, the presence or absence of an abnormality of the pre-cooler 18 can be detected during filling. Furthermore, in the case where the pre-cooler temperature is detected during filling, the controller 46 of the vehicle 3 can select or determine again the filling flow rate suitable for the detected pre-cooler temperature by referring to the filling flow rate map Ma. Thus, the hydrogen station 2 can change the filling flow rate to be suitable for the pre-cooler temperature during filling.

<Modifications>

Next, several modifications of the gas filling system 1 according to this embodiment will be described. The modifications can be applied to this embodiment singly or in combination.

According to a first modification, the tank pressure and the tank temperature can be estimated so as to determine the filling flow rate. In this case, the tank pressure and the tank temperature can be estimated using a device of the hydrogen station 2. For example, the tank pressure can be estimated from the result detected immediately after the start of filling by a pressure sensor provided in the gas flow channel 13 of the hydrogen station 2. The tank temperature can be estimated from the result of detection by the outside air temperature sensor 23.

According to a second modification, the position of the temperature sensor T for detecting the pre-cooler temperature can be changed. Since it is essential only that the temperature sensor T can detect the temperature of the hydrogen gas between the pre-cooler 18 and the upstream of the gas tank 30, the temperature sensor T can be provided on the filling nozzle 12. Alternatively, the temperature sensor T can be provided on the receptacle 32 or filling pipe 34 of the vehicle 3 to detect the temperature of the hydrogen gas discharged from the hydrogen station 2 to the gas tank 3.

According to a third modification, a plurality of gas tanks 30 can be provided. In the case where the vehicle 3 has a plurality of gas tanks, the gas tanks have different heat radiation performances depending on the positions thereof and discharge different amounts of gas depending on the way of supply to the fuel cell. Thus, in the case where the vehicle has a plurality of gas tanks 30, the filling flow rate can be determined from the filling flow rate map Ma based on the information (tank temperature and tank pressure) about the gas tank having the highest tank temperature or the gas tank having the lowest gas pressure of the plurality of gas tanks. In this case, all the gas tanks can be filled with a predetermined amount of gas in a short time while preventing the tank temperature in the gas tanks from reaching the upper limit temperature.

In the third modification, the tank temperature and the tank pressure of the gas tanks may be measured by the temperature sensor 40 and the pressure sensor 42 provided for each gas tank or measured by a single temperature sensor 40 and a single pressure sensor 42 provided for all the gas tanks. Alternatively, as described with regard to the second modification, the tank temperature and the tank pressure of the gas tanks may be estimated.

INDUSTRIAL APPLICABILITY

The gas filling system 1 according to the present invention can be applied to not only hydrogen gas but also any other gases whose temperature rises during filling. Furthermore, the gas filling system 1 according to the present invention can be applied to not only the vehicle 3 but also any other mobile bodies having a gas tank capable of being externally filled with gas, such as an aircraft, a ship and a robot.

REFERENCE SIGNS LIST 1 gas filling system
2 hydrogen station (gas station)
3 vehicle (fuel cell vehicle)
16 flow rate control valve (flow rate controlling device)
18 pre-cooler
21 communication device (first communication device)
22 display device
24 controller (second controller)
30 gas tank
40 temperature sensor
42 pressure sensor
44 communication device (second communication device)
46 controller (first controller)
48 display device
T temperature sensor
Ma filling flow rate map

The invention claimed is:

1. A gas filling system comprising a vehicle having a gas tank; and a gas station having a cooling device that cools a gas from a gas supply source, the gas station discharging the gas cooled by the cooling device to fill said gas tank with the gas, the gas filling system further comprising:
a temperature sensor that detects the temperature of the gas cooled by said cooling device on the upstream side of said gas tank; and
a first controller that is provided in said vehicle and is programmed to determine a filling flow rate of the gas to said gas,
said first controller having a map of the filling flow rate with values for the filling flow rate depending on the tank pressure, the tank temperature, and the temperature of the gas cooled by said cooling device,
said first controller selects or determines the filling flow rate based on the map of the filling flow rate;
wherein said vehicle has a first communication device connected to said first controller, and
said gas station has:
a flow rate controlling device;
a second communication device that receives information about said determined filling flow rate from said first communication device; and
a second controller that is programmed to control said flow rate controlling device to achieve the filling flow rate received by said second communication device.

2. The gas filling system according to claim 1, wherein said temperature sensor detects the gas temperature at said cooling device.

3. The gas filling system according to claim 2, wherein said temperature sensor detects said gas temperature at the start of filling or during filling.

4. The gas filling system according to claim 1, wherein at least one of said first controller and said second controller stores a transmission/reception history between said first communication device and said second communication device.

5. The gas filling system according to claim 4, wherein said transmission/reception history includes a history of transmission of the information about said determined filling flow rate from said first communication device to said second communication device.

6. The gas filling system according to claim 1, wherein said first controller determines the filling flow rate based on characteristics concerning said gas tank.

7. The gas filling system according to claim 1, wherein said first controller has a map of the filling flow rate for each gas temperature to be detected by said temperature sensor and selects the filling flow rate from the map based on the gas temperature detected by said temperature sensor.

8. The gas filling system according to claim 1, further comprising:
a display device that provides an indication that said filling flow rate is being controlled or has been controlled based on the gas temperature detected by said temperature sensor.

9. The gas filling system according to claim 1, wherein said first controller determines a lower filling flow rate when said temperature sensor detects a higher gas temperature than when said temperature sensor detects a lower gas temperature.

10. The gas filling system according to claim 1, further comprising:
a sensor that obtains information about the interior of said gas tank,
wherein said first controller determines the filling flow rate based on the information obtained by said sensor.

11. The gas filling system according to claim 10, wherein said sensor includes at least one of a temperature sensor and a pressure sensor.

12. The gas filling system according to claim 1, wherein
the gas station transmits the gas temperature of the gas station to the vehicle;
the first controller located in the vehicle determines the filling flow rate based on the gas temperature, the tank temperature, and the tank pressure; and
the first controller transmits the determined filling flow rate to the gas station;
the gas station fills the gas based on the filling flow rate transmitted from the vehicle.

* * * * *